United States Patent
Kanda (10) Patent No.: US 10,467,525 B2
(45) Date of Patent: Nov. 5, 2019

(54) RECURRENT NEURAL NETWORK TRAINING METHOD, COMPUTER PROGRAM THEREFOR AND SPEECH RECOGNITION DEVICE

(71) Applicant: National Institute of Information and Communications Technology, Tokyo (JP)

(72) Inventor: Naoyuki Kanda, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 94 days.

(21) Appl. No.: 15/570,801

(22) PCT Filed: May 10, 2016

(86) PCT No.: PCT/JP2016/063817
§ 371 (c)(1),
(2) Date: Oct. 31, 2017

(87) PCT Pub. No.: WO2016/181951
PCT Pub. Date: Nov. 17, 2016

(65) Prior Publication Data
US 2018/0121800 A1    May 3, 2018

(30) Foreign Application Priority Data
May 11, 2015    (JP) .................................. 2015-096150

(51) Int. Cl.
*G06N 3/04*    (2006.01)
*G06N 3/08*    (2006.01)
(Continued)

(52) U.S. Cl.
CPC ................. *G06N 3/08* (2013.01); *G06N 3/04* (2013.01); *G06N 3/0445* (2013.01); *G06N 3/084* (2013.01);
(Continued)

(58) Field of Classification Search
CPC .......... G06N 3/08; G06N 3/04; G06N 3/0445; G06N 3/084; G10L 15/06; G10L 15/063; G10L 15/16; G10L 2015/0635
See application file for complete search history.

(56) References Cited

U.S. PATENT DOCUMENTS
2007/0239644 A1    10/2007 Minamino

FOREIGN PATENT DOCUMENTS
JP    2009-288933 A    12/2009
WO    00/08634 B1    2/2000

OTHER PUBLICATIONS

Saon, Unfolded Recurrent Neural Networks for Speech Recognition, 2014, ISCA (Year: 2014).*
(Continued)

*Primary Examiner* — Sonia L Gay
(74) *Attorney, Agent, or Firm* — Renner, Otto, Boisselle & Sklar, LLP (57) ABSTRACT

[Object] An object is to provide a training method of improving training of a recurrent neural network (RNN) using time-sequential data.
[Solution] The training method includes a step 220 of initializing the RNN, and a training step 226 of training the RNN by designating a certain vector as a start position and optimizing various parameters to minimize error function. The training step 226 includes: an updating step 250 of updating RNN parameters through Truncated BPTT using consecutive N (N≥3) vectors having a designated vector as a start point and using a reference value of a tail vector as
(Continued)

$$s(t) = H(W_{xs} \cdot x(t) + b_s + W_{ss} \cdot s(t-1))$$

$$y(t) = G(W_{sy} \cdot s(t) + b_y)$$

a correct label; and a first repetition step 240 of repeating the process of executing the training step by newly designating a vector at a position satisfying a prescribed relation with the tail of N vectors used at the updating step until an end condition is satisfied. The vector at a position satisfying the prescribed relation is positioned at least two vectors behind the designated vector.

6 Claims, 8 Drawing Sheets

(51) Int. Cl.
    *G10L 15/06*     (2013.01)
    *G10L 15/16*     (2006.01)
(52) U.S. Cl.
    CPC ............ *G10L 15/06* (2013.01); *G10L 15/063* (2013.01); *G10L 15/16* (2013.01); *G10L 2015/0635* (2013.01)

(56) References Cited

OTHER PUBLICATIONS

International Search report for corresponding International Application No. PCT/JP2016/063817 dated Aug. 9, 2016 (Discussed in specification).
H. Jaeger (2002) "A tutorial on training recurrent neural networks, covering BPPT, RTRL, EKF and the "echo state network" approach," GMD Report 159, German National Research Center for Information Technology, 2002 (48 pp.) (Discussed in specification).
Mikael Boden "A Guide to Recurrent Neural Networks and Backpropagation," In the Dallas project, 2002. (Discussed in specification).
Tomas Mikolov "Statistical Language Models based on Neural Networks," PhD thesis, Brno University of Technology, 2012. (Discussed in specification).
G. Heigold, E. McDermott, V. Vanhoucke, A. Senior, and M. Bacchiani, "Asynchronous stochastic optimization for sequence training of deep neural networks," 2014 IEEE International Conference on Acoustics, Speech and Signal Processing (ICASSP), pp. 5587-5591. (Discussed in specification).

* cited by examiner

RECURRENT NEURAL NETWORK TRAINING METHOD, COMPUTER PROGRAM THEREFOR AND SPEECH RECOGNITION DEVICE

TECHNICAL FIELD

The present invention relates to a method of training a recurrent neural network (RNN) and, more specifically, to a RNN training method and computer program therefor that can improve training efficiency and accuracy of a RNN after training.

BACKGROUND ART

Recently, it is proposed to use a RNN as an acoustic model for speech recognition. A RNN is a neural network incorporating information of time sequence.

Figure 1:
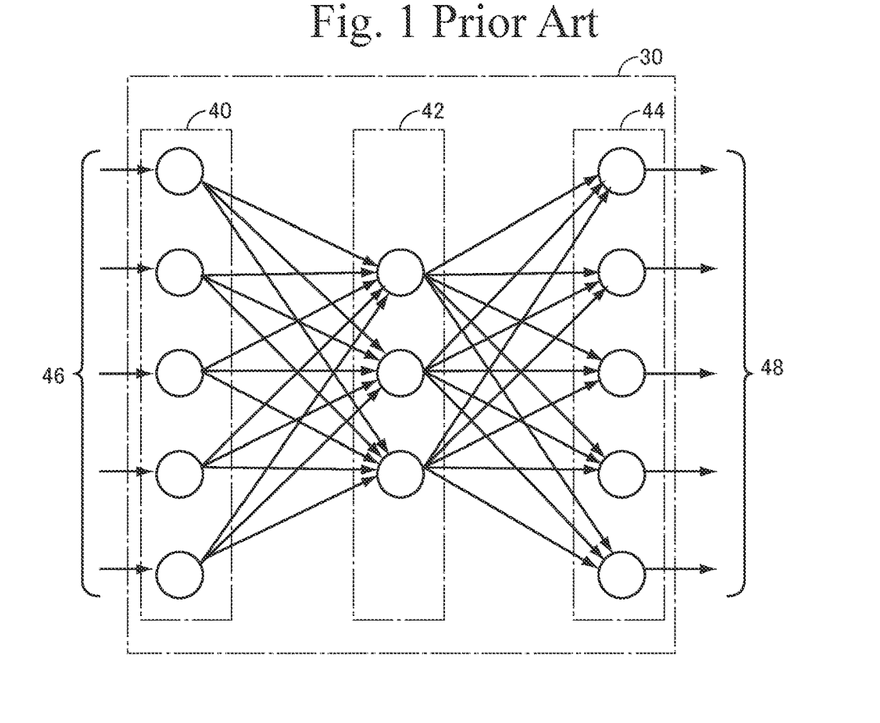
FIG. 1 is an illustration showing schematic architecture of an example of FFNN.

FIG. 1 schematically shows a principle of a common neural network. A neural network 30 includes: an input layer 40 receiving an input vector 46; a hidden layer 42 connected to input layer 40 to receive outputs from input layer 40; and an output layer 44 connected to receive outputs of hidden layer 42 and outputting an output vector 48. Though FIG. 1 shows an example having only one hidden layer for simplicity of drawing, the number of hidden layers is not limited to one.

In such a neural network, data flows in one direction from input layer 40 to hidden layer 42 and from hidden layer 42 to output layer 44. Therefore, this type of neural network is referred to as a feed-forward neural network (FFNN). Each connection from one node to another is sometimes weighted or biased, and the values of such weights and biases are determined through training. At the time of training, training data is given as input vector 46 to hidden layer 42, and output vector 48 is obtained from output layer 44. Error between the output vector 48 and correct data is given from the side of output layer 44 to each node of hidden layer 42 and input layer 40, and the values of weights and biases are optimized so that the error of neural network 30 is minimized.

Figure 2:
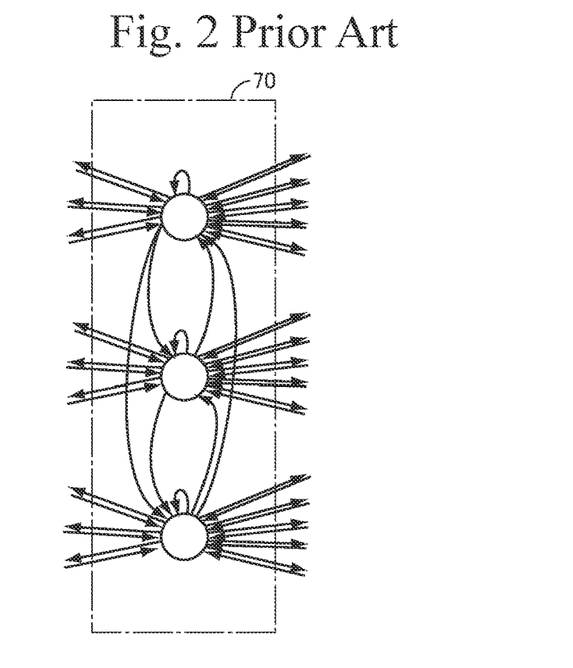
FIG. 2 is a schematic illustration showing an example of a hidden layer of a RNN.

Different from a FFNN in which nodes are connected in one direction, a RNN includes node connections in opposite directions, connections of nodes in the same layer, and self-loop of each node. FIG. 2 schematically shows architecture related to node connections of an example of hidden layer in a RNN. Referring to FIG. 2, this hidden layer 70 includes, for example, three nodes. Each of these three nodes has connections for receiving data from a lower layer (closer to the input layer), connections for passing data to an upper layer (closer to the output layer), connections for passing data to nodes of a lower layer, connections with nodes in the same hidden layer 70, and a self loop. Each of these connections is weighted, or has a parameter as a weight allocated. The number of such parameters could be millions to tens of millions. For an application as an acoustic model for speech recognition, these must be automatically learned from a speech corpus (pairs of speech data and texts).

Back-propagation through time method (hereinafter referred to as "BPTT") and its modification, Truncated back-propagation through time method (hereinafter referred to as "Truncated BPTT") have been known as methods of RNN training.

CITATION LIST

Non Patent Literature

NPL 1: H. Jaeger (2002): A tutorial on training recurrent neural networks, covering BPPT, RTRL, EKF and the "echo state network" approach. GMD Report 159, German National Research Center for Information Technology, 2002 (48 pp.)
NPL 2: Mikael Boden: A Guide to Recurrent Neural Networks and Backpropagation. In the Dallas project, 2002.
NPL 3: Tomas Mikolov: Statistical Language Models based on Neural Networks. PhD thesis, Brno University of Technology, 2012.
NPL 4: G. Heigold, E. McDermott, V. Vanhoucke, A. Senior, and M. Bacchiani, "Asynchronous stochastic optimization for sequence training of deep neural networks," in Acoustics, Speech and Signal Processing (ICASSP), 2014 IEEE International Conference on. IEEE, 2014, pp. 5587-5591.

SUMMARY OF INVENTION

Technical Problem

Non-Patent Literature 1 above discloses two methods: one is BPTT using all inputs and all correct data in one whole sequence; and the other is Truncated BPTT, in which BPTT is performed for a partial sequence of a whole sequence using all inputs and all correct data in the entire partial sequence, while shifting the partial sequence in the whole sequence.

Non-Patent Literature 2 and Non-Patent Literature 3 citing Non-Patent Literature 2 disclose variations of Truncated BPTT method described in Non-Patent Literature 1, in which a partial sequence includes one sample.

Non-Patent Literature 4 discloses a method of improving efficiency of RNN training by simultaneously processing a plurality of time-sequential data.

It has been known, however, that each of the methods disclosed in Non-Patent Literatures 1 to 4 suffers from inefficiency in training time-sequential data of continuous values, such as speech data.

In this regard, it has been known that FFNN training also suffers from inefficiency when adjacent training data are similar. For this reason, in a FFNN, a method of re-arranging all samples at random before training has been adopted. This approach lowers the possibility that similar training data are positioned adjacent to each other, and hence, improves training efficiency.

In the case of time-sequential data such as speech data, however, time relation between samples is significant. Such time-related information is lost if the data are re-arranged at random. Therefore, when handling such data, random re-arrangement of training data used for a FFNN is not feasible. Such being the case, when RNN training is to be done using continuous time-sequential data such as speech data, improving the efficiency of training has been a big problem. Here, improving the efficiency of training means: the accuracy may be improved using the same training data, without increasing computational time; or the accuracy comparative to existing methods may be attained using smaller amount of training data and shorter training time.

Therefore, an object of the present invention is to provide a training method that can improve efficiency of RNN training based on time-sequential data.

Solution to Problem

According to a first aspect, the present invention provides a RNN training method executed by a computer using training data prepared in advance. The training data includes a sequence of vectors each consisting of a feature of data to be trained and a reference value. The training method includes the steps of: initializing the RNN; a first designating step of designating, as a training start position, a certain vector in the sequence of vectors; and a training step of training the RNN by optimizing various parameters of the RNN such that a prescribed error function calculated for the training data is minimized. The training step includes: an updating step of updating the parameters of the RNN by Truncated BPTT, using, of the sequence of vectors, consecutive N vectors, where N is an integer not smaller than 3, having the designated vector as a head, and having a reference value of a vector at the tail of the consecutive N vectors as a correct label; and a first repetition step of repeating, until a predetermined end condition is satisfied, a process of executing the training step by newly designating a vector at a position satisfying a prescribed relation with the vector at the tail of the N vectors used in the updating step. The vector at the position satisfying the prescribed relation is a vector positioned at least two or more vectors behind the designated vector designated at the selecting step.

Preferably, the vector at the position satisfying the prescribed relation is a vector positioned at the tail of the N vectors.

More preferably, the RNN training method further includes: a second designating step, responsive to a determination that the end condition of the first repetition step is satisfied at the first repetition step, of newly designating a vector, positioned by a number smaller than N behind the vector designated at the first designating step, as a start position of next training; and a step of executing the training step until the end condition is satisfied.

More preferably, the number smaller than N is 1.

The RNN training method further includes: a second repetition step, responsive to a determination that the end condition is satisfied at the first repetition step, of executing the training step repeatedly while designating a vector at a position moved further backward by one from the certain vector for each repetition as a new start position of next training, until a process designating a vector positioned N−1 behind the certain vector is finished.

Each of the vectors forming the vector sequence may consist of speech data feature obtained by converting the speech and a reference value consisting of a phoneme label of the speech.

According to a second aspect, the present invention provides a computer program causing a computer to execute all the steps of any of the RNN training methods described above.

According to a third aspect, the present invention provides a speech recognition device, including: framing means for framing an input speech signal with a prescribed shift length and a prescribed frame length; feature extracting means for extracting a prescribed speech feature from each frame of speech signal output from the framing means and outputting a feature vector; an acoustic model implemented by a RNN trained by any of the above-described training methods, receiving as an input a sequence of feature vectors output from the feature extracting means and outputting, every time a feature vector is input, a vector having as elements probability of a speech of the frame corresponding to the feature vector being each element of a set of assumed phonemes; and a speech recognition decoder outputting, by a probabilistic process using a sequence of vectors output from the acoustic model and a statistical language model, a word sequence having highest likelihood of generating the speech signal.

DESCRIPTION OF EMBODIMENTS

In the following description and in the drawings, the same components are denoted by the same reference characters. Therefore, detailed description thereof will not be repeated. In the following embodiments, an example where a RNN is applied to an acoustic model will be described. The present invention, however, is not limited to such embodiments, and it is applicable to any embodiment in which a RNN is trained using time-sequential data. Possible application may include, for example, speech recognition, automatic translation, image recognition, and motion picture recognition.

Speech features used in the present embodiment include log powers for each outputs of a mel filter bank, and their delta (first order differential) and delta-delta (second order differential). It is possible, however, to use other speech features such as mel frequency cepstrum coefficients or speech features obtained by linear prediction.

Further, a RNN is typically realized by a computer and a program running thereon. The program realizing a RNN is implemented by a set of information representing an architecture of RNN (number of layers, number of nodes in each layer, information related to connections among nodes, values of weight and bias allocated to each connection, memory locations for realizing unfolding as will be described later and information related to connection between them and each node) and a program routine calculating the value of each node given its inputs. Further, for training, a program for training is necessary.

[First Embodiment]

<Training Method of the Present Embodiment>

An acoustic model using a RNN as will be described in the following receives as input time-sequence of speech feature vectors x(t), and outputs probability P(s|x(t)) of the speech feature being an output value s of a hidden Markov model. Hereinafter this output will be denoted as y(t). When a RNN is used as an acoustic model, P(x(t)|s) is used for likelihood calculation. Therefore, for the acoustic model, an output of RNN is modified in accordance with the following equation based on Bayes' theorem, and used.

$$P(x(t)|s) = \frac{P(s|x(t))P(x(t))}{P(s)}$$

Error back-propagation has been known as a method of training a FFNN. In error back-propagation, for each training data, the data is given to the input layer, and through the hidden layer or layers, an output of the FFNN is obtained at the output layer. An error between this output and correct data is propagated backward from the output layer to the input layer of the FFNN, and weight values allocated to connections between respective nodes are adjusted to minimize the error.

Error back-propagation as such cannot be directly applied to a RNN, since, different from a FFNN, a RNN involves circulating paths. It becomes possible, however, to utilize error back-propagation for training a RNN by adopting the following approach. Specifically, a RNN is treated such that the network at different time points when a sequence of training data is given, is treated as different networks and the outputs from each node at one time point are given to various nodes at the next time point.

Figure 3:
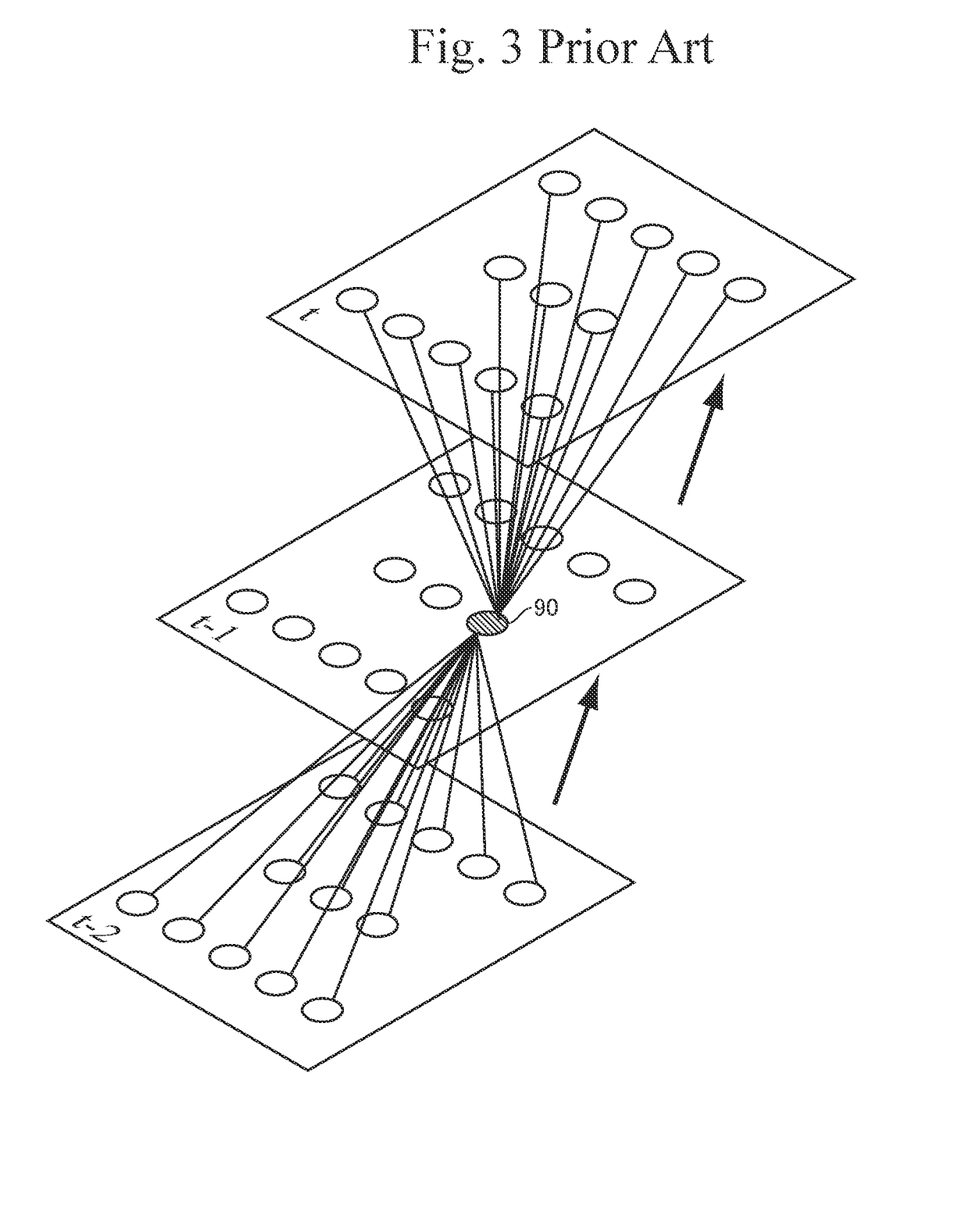
FIG. 3 is a schematic illustration showing unfolding of a RNN.

This concept is shown in FIG. 3, in which outputs from each node in the network at time point t−2 are applied to various nodes at time point t−1, treating the network at different time points as different networks. For easier understanding of this relation, FIG. 3 shows an example of such a relation between input/output connections of a node 90 at time point t−1 only. The same is true for other nodes.

Referring to FIG. 3, inputs to node 90 at time point t−1 are only those from respective nodes of the network at time point t−2. Outputs from node 90 at time point t−1 are applied only to the nodes of the network at time point t. Thinking in this manner, the data flows only in one direction when viewed in a time-sequence. Therefore, it becomes possible to handle a RNN like a FFNN, and training based on error back-propagation becomes applicable to the RNN. Treating a RNN as different RNNs at different time points as described above is referred to as "unfolding."

Figure 4:
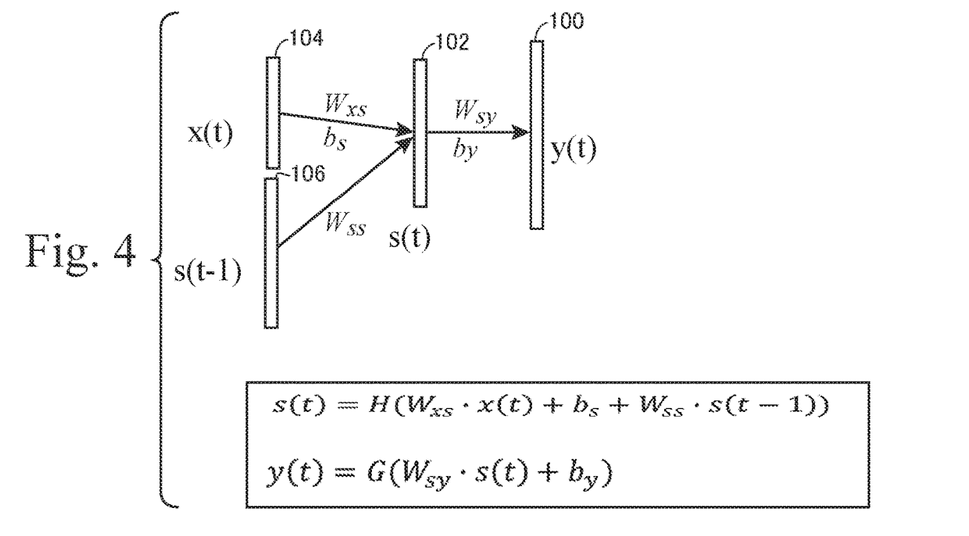
FIG. 4 shows relations of connections between various layers and corresponding weight matrices, when a RNN is unfolded by one step.

For introducing parameters to be learned by a RNN, relations between inputs to hidden layers and outputs from hidden layers in the RNN will be discussed. Here, for simplicity of description, an example having only one hidden layer will be described. FIG. 4 shows an example of an unfolded RNN. Referring to FIG. 4, a feature vector given to an input layer 104 at time t is represented as x(t), a state of a hidden layer 102 as s(t) and an output vector from an output layer 100 as y(t). When we denote the hidden layer of an immediately preceding step as hidden layer 106, the state of hidden layer 106 is represented as s(t−1). Let $W_{xs}$ represent a matrix consisting of weights of connections between respective nodes of input layer 104 and respective nodes of hidden layer 102, $b_s$ its bias vector, $W_{sy}$ a matrix consisting of weights of connections between respective nodes of hidden layer 102 and respective nodes of output layer 100, $b_y$ its bias vector, and $W_{ss}$ a matrix consisting of weights of connections between respective nodes of hidden layer 106 of the immediately preceding step and respective nodes of hidden layer 102. Then, the value s(t) of hidden layer 102 and the output y(t) from output layer 100 can be updated in accordance with the following equations.

$$s(t) = H(W_{xs} \cdot x(t) + b_s + W_{ss} \cdot s(t-1)) \qquad (1)$$

$$y(t) = G(W_{sy} \cdot s(t) + b_y) \qquad (2)$$

Here, H( ) represents Tanh between corresponding elements or sigmoid function between corresponding elements. G( ) is a function called softmax function. When we represent elements of vector a as $a_i$ (i=1, . . . n), the i-th element of G(a) is given by the following equation.

$$G_i = \frac{\exp(a_i)}{\sum_{j=1}^{n} \exp(a_j)} \qquad (3)$$

As is apparent from the foregoing, it is necessary to calculate values of elements of matrices $W_{xs}$, $W_{ss}$, and bias vectors $b_s$ and $b_y$, as RNN parameters. Training of a RNN is the process of finding these values. Here, an example will be described in which values of hidden layers of the three steps preceding the present time point are used to train a RNN by Truncated BPTT.

Figure 5:
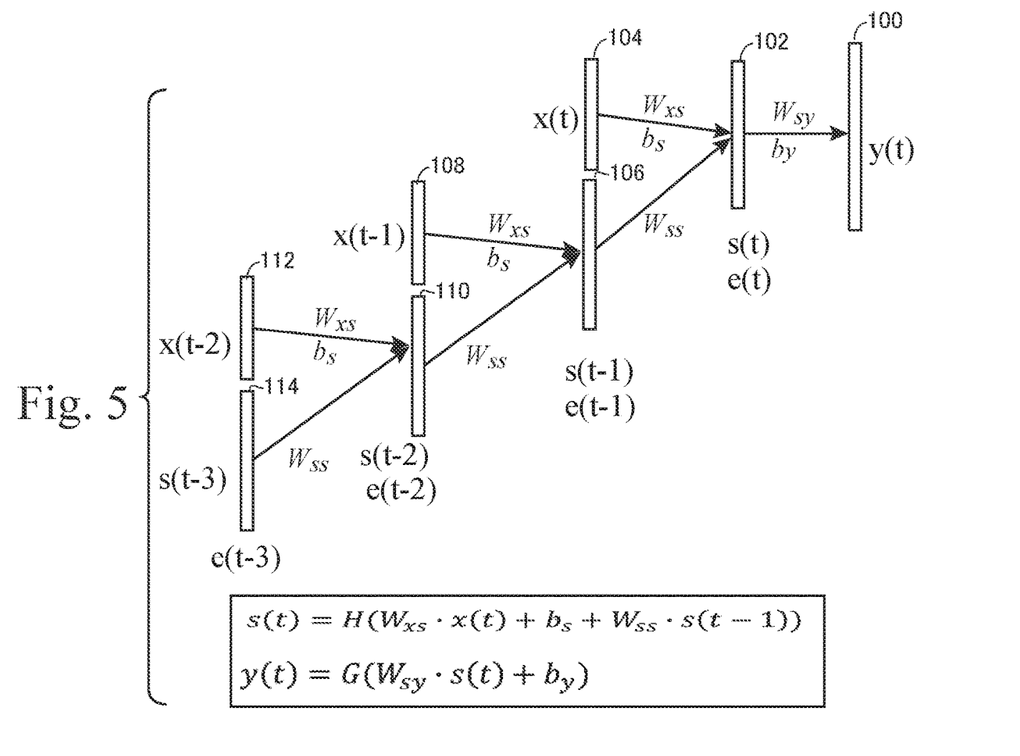
FIG. 5 shows relations of connections between various layers and corresponding weight matrices, when a RNN is unfolded by three steps.

Referring to FIG. 5, in this example, the relations of the output y(t) of output layer 100, the value s(t) of hidden layer 102, the input x(t) to input layer 104 and hidden layer 106 of the immediately preceding step are the same as those shown in FIG. 4, and the value s(t) of hidden layer 102 and the output y(t) of output layer 100 are represented by equations (1) and (2) above. It is noted, however, that in order to obtain the output y(t) of RNN using the outputs of hidden layer 102 of the preceding three steps as shown in FIG. 5, we must have the input vector x(t−1) to input layer 108 of the immediately preceding step, the input vector x(t−2) to input layer 112 two steps prior to the present step, the value s(t−2) of hidden layer 110 two steps prior to the present step, and the value s(t−3) of hidden layer 114 three steps prior to the present step. Therefore, it is necessary to store these values by securing memory locations therefor. The weights of connections between them are the same as those given in equation (1) above. In each of hidden layers 102, 106, 110 and 114, state data s(t), s(t−1), s(t−2) and s(t−3) include errors e(t), e(t−1), e(t−2) and e(t−3), respectively.

Figure 6:
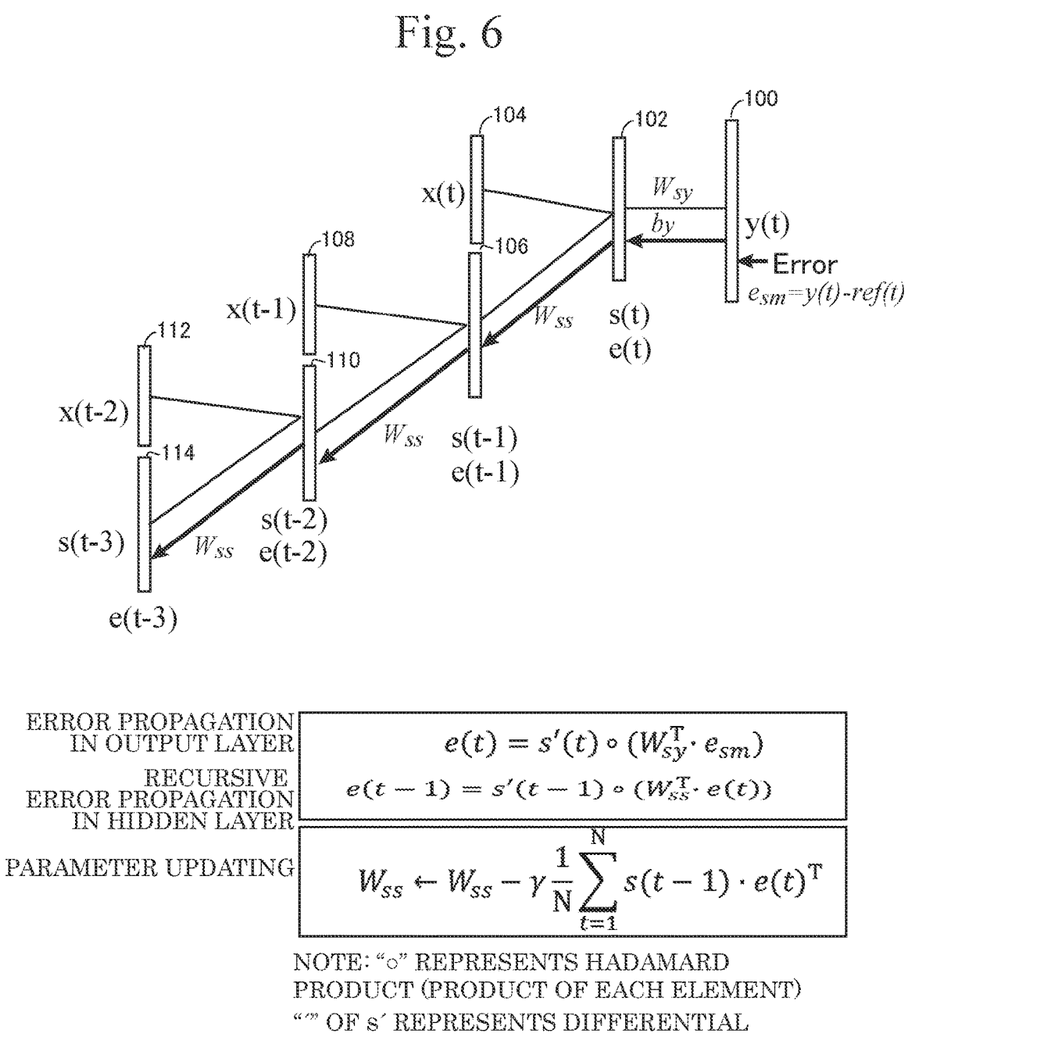
FIG. 6 shows relations of error back-propagation, weight matrices, values of hidden layers and errors of respective layers, when a RNN is unfolded by three steps.

Referring to FIG. 6, RNN training using Truncated BPTT (updating of parameters) proceeds as follows. As shown in FIG. 5, the output of three-step-earlier hidden layer and the two-step-earlier input are used to calculate the output y(t) of RNN at time point t. Here, the training data includes a reference value ref(t) for the input vector x(t). The error $e_{sm}$ between these is $e_{sm}$=y(t)−ref(t). The sign of the error may be reversed in some implementations. Updating of parameter $W_{ss}$ by error back-propagation is done in the following manner.

First, propagation of error e(t) in the output layer and recursive propagation of error e(t−1) in the hidden layer 102 are calculated in accordance with equations (4) and (5) below.

$$e(t) = s'(t) \circ (W_{sy}^T \cdot e_{sm}) \qquad (4)$$

$$e(t-1) = s'(t-1) \circ (W_{ss}^T \cdot e(t)) \qquad (5)$$

where s' represents differential of s, and "∘" represents Hadamard product.

Parameter $W_{ss}$ is updated in accordance with equation (6) below.

$$W_{ss} \leftarrow W_{ss} - \gamma \frac{1}{N} \sum_{t=1}^{N} s(t-1) \cdot e(t)^T \qquad (6)$$

Here, $\gamma$ represents learning ratio and N represents the number of training data. Further, not only $W_{ss}$ but also other parameters are likewise updated.

According to a first one of conventional RNN training methods, the whole training data sequence is used as an input, and Truncated BPTT is performed using RNN outputs at each time point of training data sequence and correct data at the time point. This process is repeated successively for each sequence of training data.

The second method uses a necessary one of training data sequences to obtain a RNN output at a certain time point. The output and the correct data at that time point are used to update the parameters by Truncated BPTT. This process is executed for each time point, and when the whole training data is processed, the parameter training is done.

These methods of training, however, do not have very high efficiency, as already mentioned. One reason thereof is that in consecutive time-sequential data such as acoustic data, adjacent data are similar to each other. As already described, in a FFNN, training efficiency is low if adjacent training data are similar, and the same applies to a RNN.

Figure 7:
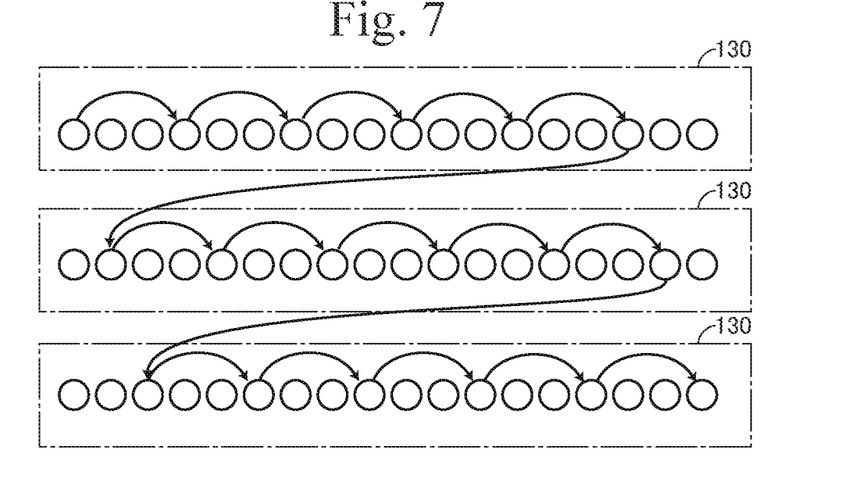
FIG. 7 schematically shows a method of selecting training data in accordance with an embodiment of the present invention.

Therefore, in the present embodiment, this problem is solved in the following manner. Referring to FIG. 7, the present embodiment does not use the method of updating parameters using adjacent training data consecutively when training data sequence 130 is supplied. Instead, when parameters are once updated using certain training data, the parameters are next updated using training data not adjacent to the certain training data but using every certain number of training data while skipping over a prescribed number (in the example of FIG. 7, the prescribed number is 2) (in FIG. 7, using training data third from the learned data). In the following, the distance between training data used for successive training will be referred to as "skip length." In the example of FIG. 7, the skip length is 3.

When training in this manner is repeated almost to the tail of training data sequence 130 and there is no longer any training data left selectable in this manner, the first round of training ends. When the training is terminated at this point, in the example of FIG. 7, the data used for training is about one third of the entire data and, hence, the amount of calculation is also about one third of the conventional method of calculation. Even with this smaller amount, accuracy of trained RNN is higher than that of the conventional method. Still further, in order to effectively use the entire training data, the present embodiment returns to the head of training data sequence 130, and by selecting, as the starting data, the training data next to the training data selected as the object in the first round, the skip training process same as the first round is repeated. Then, the process is executed the third time in the similar manner. By such repetition, training is done using the entire training data.

According to this method, in each round of training, adjacent training data are not used consecutively. In the example of FIG. 7, every third training data is used. Since use of adjacent training data is avoided, training efficiency can be improved. When this method was adopted in acoustic model training, model accuracy was confirmed to be improved, as will be described later.

<Configuration>

Figure 8:
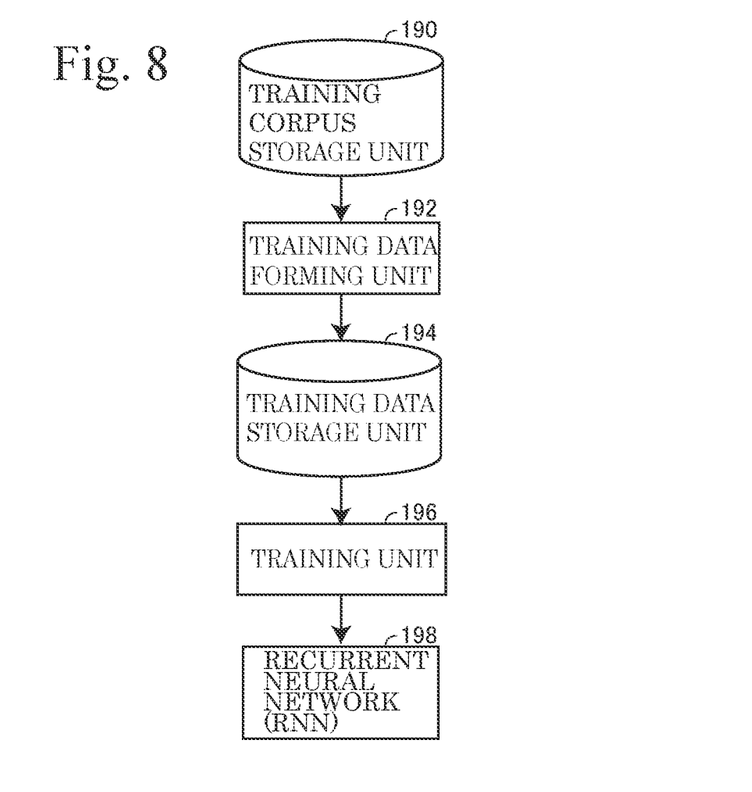
FIG. 8 is a block diagram showing architecture of RNN training system in accordance with an embodiment of the present invention.

FIG. 8 shows, in a block diagram, a configuration of the training system for training RNN described above. Referring to FIG. 8, the system includes a training corpus storage unit 190 for storing the speech corpus used in training. Training corpus storage unit 190 stores a speech corpus, which includes speech data of a large number of utterances, and texts forming pairs therewith. Further, the speech data and the texts are aligned with each other, so that it is possible to find which part of speech data corresponds to which phoneme.

The system further includes: a training data forming unit 192 for framing speech data of each utterance stored in training corpus storage unit 190 with a prescribed shift length and a prescribed frame length permitting partial overlapping, adding a label of corresponding phoneme to each frame and outputting the results as training data; a training data storage unit 194 for storing the training data output from training data forming unit 192; and a training unit 196 for performing training of RNN 198 by the method described above, using the training data stored in training data storage unit 194. It is the training unit 196 that realizes the process different from the conventional examples.

Figure 9:
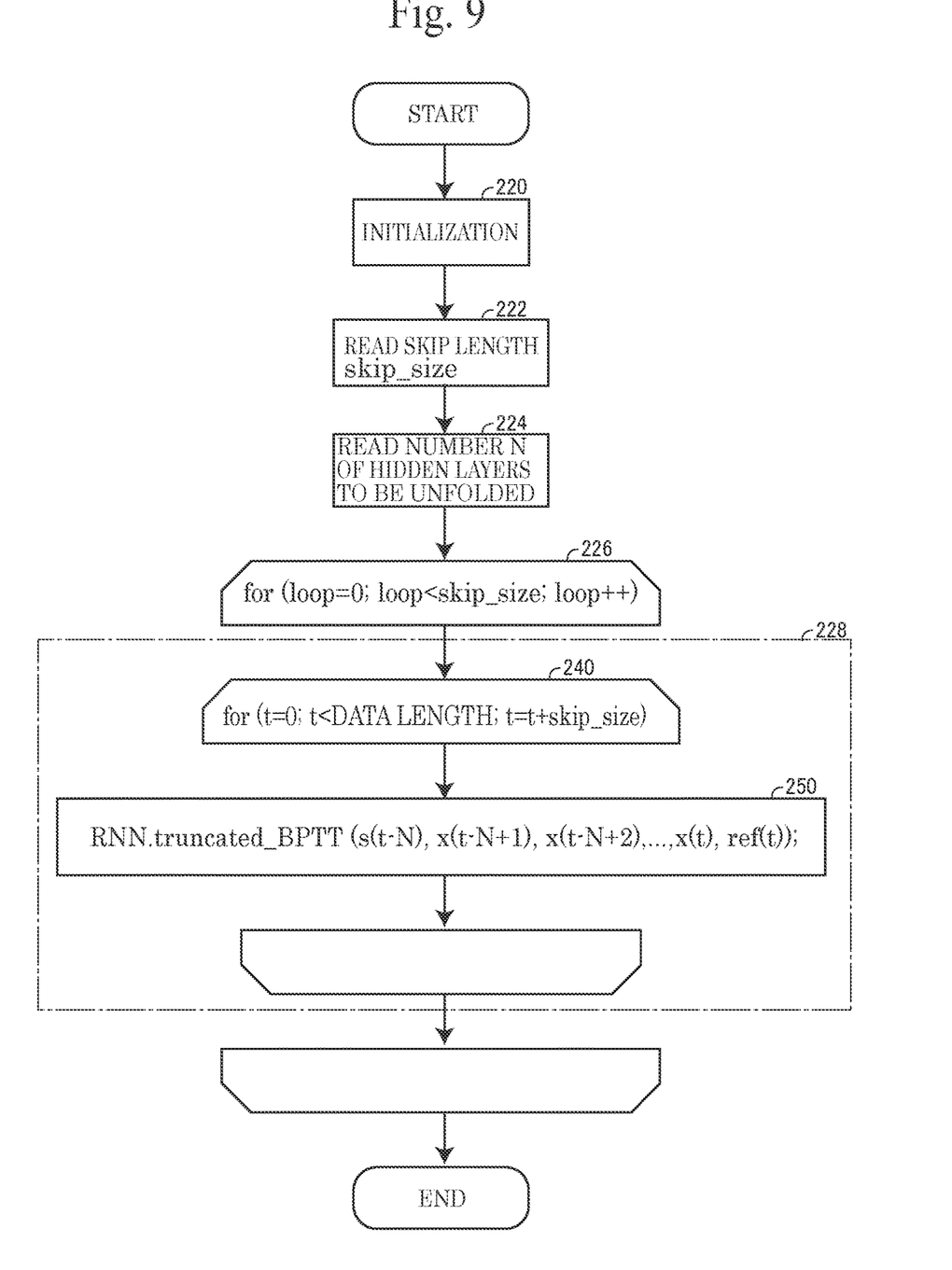
FIG. 9 is a flowchart showing a control structure of a computer program realizing a training unit of the training system shown in FIG. 8.

Training unit 196 is implemented by computer hardware and a program executed by central processing unit (CPU) of the computer hardware. Referring to FIG. 9, the program includes: a step 220 of securing locations for storing various parameters of the RNN on a memory and initializing each parameter in accordance with a prescribed initializing method; a step 222 of reading skip length SKIP_SIZE as a variable stored in a storage such as hard disk, and storing it in the memory; a step 224 of reading the number N of hidden layers to be unfolded at the time of training the RNN from a storage such as hard disk and storing it in the memory; and a step 226 of repeating a process 228 while changing one by one the value of iteration control variable LOOP from 0 to the value of variable SKIP_SIZE.

The process 228 repeatedly executed at step 226 includes a step 240 of executing a process 250 of executing a function RNN.truncated_BPTT while incrementing the value of variable t by variable SKIP_SIZE, with the initial value of variable t being 0. Here, the function RNN.truncated_BPTT is a function for executing Truncated BPTT and its arguments are, with t being the time point of interest, the value s(t−N) of hidden layer at time point t−N, the values x(t−N+1), x(t−N+2), . . . , x(t) of inputs from time point t−N+1 to time point t, and correct label ref(t) at time point t.

<Operation>

The RNN training system in accordance with the present embodiment of which configuration is shown in FIGS. 8 and 9 operates as follows. The operations of this device from generating training data from the speech corpus stored in training corpus storage unit 190 to storing them in training data storage unit 194 are the same as the conventional operations.

Training unit 196 performs the following process by executing the program having the control structure shown in FIG. 9.

In the process of executing this program, at the initializing step 220, memory locations for storing RNN parameters are secured in a storage device such as a memory, and each memory location is initialized with an appropriate value. At this time, the value s of hidden layer is practically meaningless and it may be initialized to an arbitrary value, for example, 0. Naturally, it may be initialized with a value determined beforehand in some way or other.

At the following step 222, the skip length is read from the storage device, and stored in a location allocated to the variable SKIP_SIZE of the memory. Here, the skip length refers to the number of data between two training data selected at the time of training. At step 224, the number of hidden layers to be unfolded in training the RNN is read from the storage device and stored in a memory location allocated to variable N.

At step 226, at first, the value of variable LOOP is determined to be 0. Then, whether or not the value of variable LOOP satisfies an end condition (LOOP<SKIP_SIZE) is determined. Variable SKIP_SIZE is a positive integer not smaller than 2. Therefore, by the determination of the first repetition, this end condition is not satisfied, and the process 228 is executed. When execution of process 228 ends, the value of variable LOOP is incremented by 1, and whether or not the end condition is satisfied is determined. If the end condition is not satisfied, the process 228 is repeated. In this manner, the process 228 is repeatedly executed until the end condition is satisfied.

In each repetition of process 228, the process 250 is executed repeatedly under the condition determined at step 240. At step 240, the value of variable t is set to 0 at the first repetition. In other words, the current time t is set to t=0. Thereafter, whether or not the end condition of repetition (t<data length) is satisfied or not is determined. Here, the data length corresponds to the number of training data. If the end condition is not satisfied, the process 250 is executed. Specifically, using the value s(t−N) of the hidden layer, the values x(t−N+1), x(t−N+2), . . . , x(t) of inputs from time point t−N+1 to time point t and the correct label ref(t) at time point t as arguments, the function RNN.truncated_BPTT is executed. At the first process, these values are undetermined, and hence, 0 may be used as the initial values.

At step 240, the process 250 thus described is repeatedly executed with the value of variable t incremented by the value of variable SKIP_SIZE. By executing the process 250 while incrementing the value of variable t by the value of variable SKIP_SIZE, selection of training data and updating of parameters are executed as shown at the uppermost part of FIG. 7.

In the present embodiment, the process 228 is repeated by the value of variable SKIP_SIZE. The above-described method, however, ensures sufficiently high accuracy even when the number of repetition is small. If the value of variable SKIP_SIZE is 2 or larger, it is possible to train the RNN with higher accuracy than the conventional methods even by executing the process 228 only once. In that case, the time necessary for training becomes shorter than the conventional methods. It is noted, however, that by the approach of the present embodiment, in which after the training process with training data skipping is finished, the same training process using the skipped training data is resumed from the head of the training data, starting from a position shifted behind by one as indicated by the second part of FIG. 7 and the similar process is repeated thereafter, it becomes possible to efficiently utilize the entire training data and to improve efficiency of the RNN. Even in that case, the amount of calculation and hence the speed of processing are comparable to those of the conventional art.

In the present embodiment, an example in which the number of hidden layers to be unfolded is three has been described. The present invention, however, is not limited to such an embodiment. The value N may be any value appropriate for the amount of calculation and the amount of available data. Conventional RNN training often uses N=9 and N=15.

In short, according to the method of the embodiment above, parameters are updated by Truncated BPTT by selecting training data spaced by a prescribed number. In this process, values of hidden layers corresponding to unselected training data are also calculated. Therefore, it is possible to calculate errors from these and to utilize the errors for training. Conventional Truncated BPTT actually calculated and utilized the errors. The method of the invention corresponds to training omitting the calculation of errors. Seemingly, this approach would lead to lower efficiency of training, since available error information is not used. In fact, however, the RNN training efficiency becomes higher, contrary to expectations. Conventionally, there seems to have been too much focus on the efficiency of using the training data, making it difficult to find such a method of updating parameters while discarding part of calculation results, by using training data skipping.

<Effects>

Figure 10:
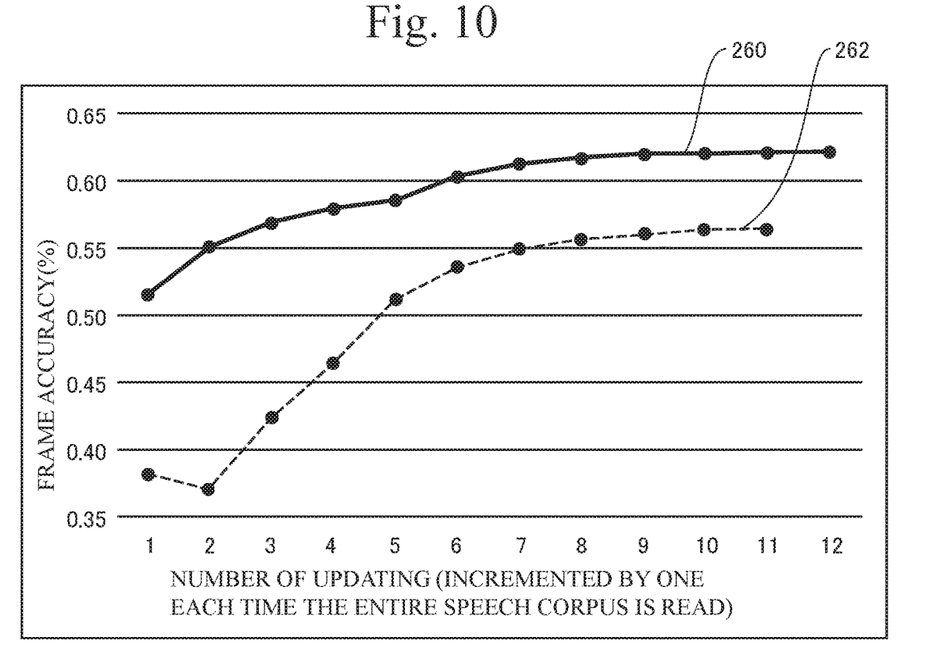
FIG. 10 is a graph showing, in comparison with a conventional method, effects of the training method in accordance with an embodiment of the present invention.

FIG. 10 shows a graph 260 plotting frame accuracy attained by using an acoustic model 308 by the RNN trained in accordance with the method of training of the present embodiment, and a graph 262 plotting frame accuracy attained by using an acoustic model obtained by the RNN trained by the second one of the conventional methods. Regarding the graphs of FIG. 10, common speech of an English lecture was input frame by frame to each RNN, and whether resulting outputs of RNN indicate correct phonemes or not was determined and the accuracy thereof (frame accuracy) was found, which is on the ordinate, and the number of updating of training is on the abscissa. The two RNNs used had the same architecture, and only the training methods were different.

Speech recognition error rate when the RNN training by the method above was eventually finished (error rate at the output of speech recognition decoder 310 of FIG. 11, which will be described later) was 18.8%. On the other hand, speech recognition error rate when the RNN training by the conventional method was eventually finished was 21.9%.

As can be seen from FIG. 10, when a RNN is trained using the training method of the present embodiment, higher accuracy can be attained with smaller number of updating. Further, when training is finished eventually, the accuracy of the model obtained by the above-described method comes to be significantly higher than that attained by the conventional method.

In the present embodiment, before executing the processes 228 and 250 shown in FIG. 9, determination is done as to whether the repetition end condition is satisfied. The present invention, however, is not limited to such an embodiment. Whether or not the end condition is satisfied may be determined after executing the process 228 or 250.

[Second Embodiment]

The first embodiment described above relates to the RNN training method and system. The second embodiment relates to a speech recognition device using the RNN trained by the RNN training method or system of the first embodiment as an acoustic model.

Figure 11:
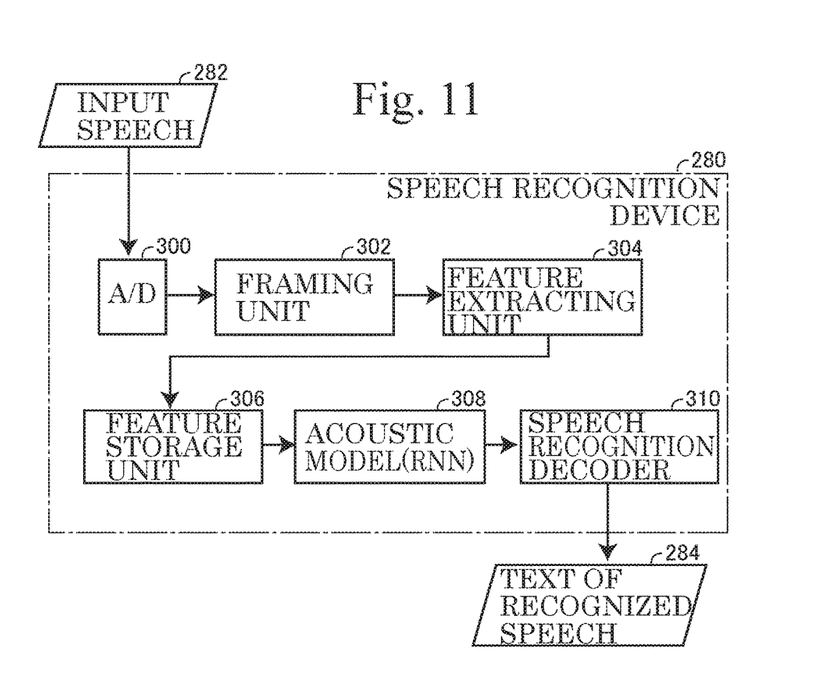
FIG. 11 is a block diagram of a speech recognition device using an acoustic model implemented by a RNN trained by the training method in accordance with an embodiment of the present invention.

Referring to FIG. 11, a speech recognition device 280 in accordance with the second embodiment has a function of performing speech recognition on input speech 282 and outputting the result as a text 284 of recognized speech. Speech recognition device 280 includes: an A/D converter circuit 300 for performing analog/digital (A/D) conversion of input speech 282 and outputting the result as a digital signal; a framing unit 302 for framing the digitized speech signal output from A/D converter circuit 300 with a prescribed length and prescribed shift length permitting partial overlapping; and a feature extracting unit 304 performing a prescribed acoustic process on each of the frames output from framing unit 302 and thereby extracting speech features of the frame and outputting a feature vector. Each frame and feature vector has added thereto information such as relative time with respect to, for example, the beginning of input speech 282. As the features, log-powers of the outputs of mel filter bank, their first order differential and their second order differential, for example, are used, as mentioned above.

Speech recognition device 280 further includes: a feature storage unit 306 for temporarily storing feature vectors output from feature extracting unit 304; an acoustic model 308 implemented by a RNN, for receiving as an input the feature vector stored in feature storage unit 306 and outputting vectors indicating, phoneme by phoneme, a probability that each frame at each time point corresponds to a certain phoneme; and a speech recognition decoder 310, for performing a probabilistic process using the vector output from acoustic model 308 and a statistical language model, not shown, for outputting a word sequence having the highest likelihood as a text 284 of recognized speech corresponding to the input speech 282.

The number of nodes of the input layer of acoustic model 308 is the same as the number of elements of the feature vector. The number of nodes of the output layer of acoustic model 308 is the same as the number of phonemes assumed for the language handled by speech recognition device 280. At each node of the output layer, probability of a speech input at a time point being the phoneme represented by that node is output. Therefore, an output of acoustic model 308 is a vector having, as elements, the probabilities of input speech at that time point being the phoneme represented by respective nodes.

Speech recognition decoder 310 is a decoder using a model called WFST (Weighted Finite State Transducer) trained in advance. The WFST used here is a graph built beforehand based on language-related knowledge, and it uses a knowledge source referred to as HCLG. H stands for HMM, C context, L lexicon and G grammar. Each node of WFST represents a state (phoneme), and an arc connecting nodes represents a state transition. Each arc has a weight allocated. The weight represents probability of state transition.

Speech recognition decoder 310 calculates probability of a phoneme sequence by the WFST for each element of the vector output from acoustic model 308, and traces the WFST while appropriately performing pruning, whereby a word sequence having the highest likelihood is eventually output as text 284 of recognized speech.

As already described, by using the RNN in accordance with the first embodiment as acoustic model 308, the accuracy of speech recognition by speech recognition device 280 becomes higher than the conventional examples. Further, training efficiency of the acoustic model can be improved and hence, the cost for building the model can be reduced. Thus, a speech recognition device with high efficiency can be realized at a low cost.

[Computer Implementation]

The RNN training system and speech recognition device 280 in accordance with the embodiments of the present invention can be implemented by computer hardware and the computer program running on the computer hardware.

Figure 12:
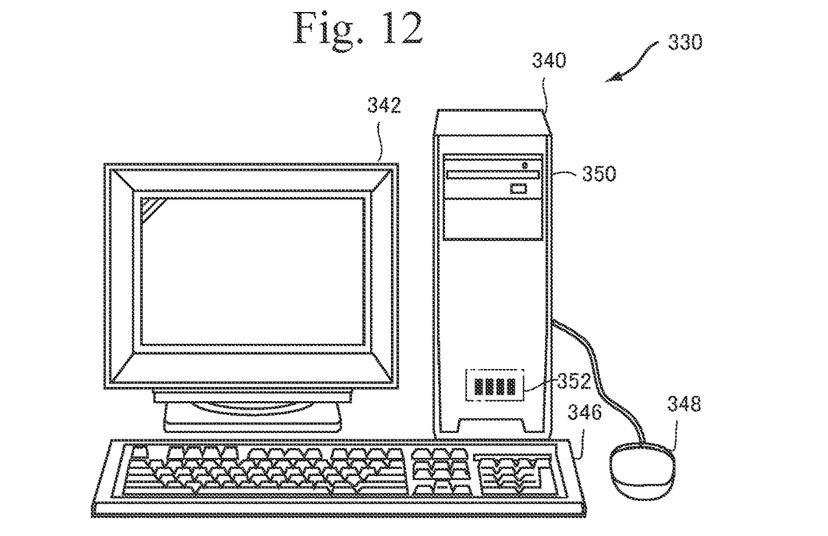
FIG. 12 shows an appearance of a computer executing a program for generating training data.
Figure 13:
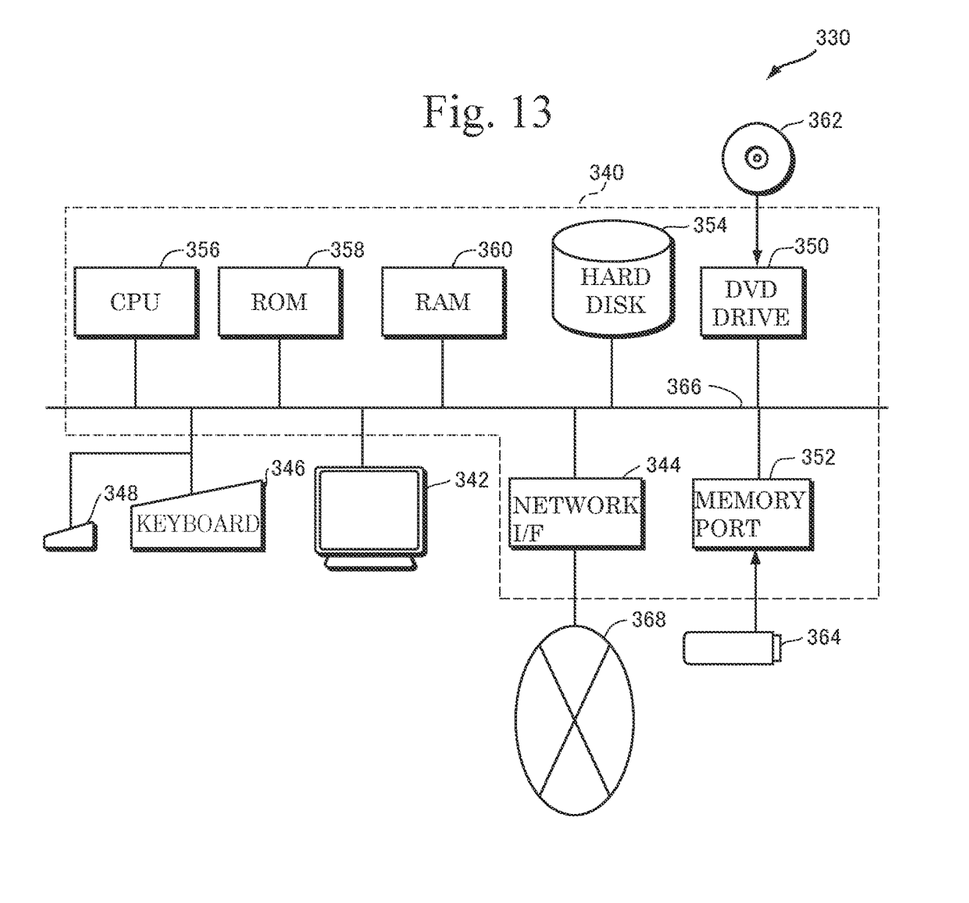
FIG. 13 is a hardware block diagram of the computer of which appearance is shown in FIG. 12.

FIG. 12 shows an appearance of computer system 330 and FIG. 13 shows an internal configuration of computer system 330.

Referring to FIG. 12, computer system 330 includes a computer 340 having a memory port 352 and a DVD (Digital Versatile Disc) drive 350, a keyboard 346, a mouse 348 and a monitor 342.

Referring to FIG. 13, in addition to memory port 352 and DVD drive 350, computer 340 includes a CPU (Central Processing Unit) 356, a bus 366 connected to CPU 356, memory port 352 and DVD drive 350, a read only memory (ROM) 358 for storing a boot program and the like, a random access memory (RAM) 360 connected to bus 366 and storing program instructions, a system program and work data, and a hard disk 354. Computer system 330 further includes a network interface (UF) 344 providing a connection to a network 368, enabling communication with other terminals.

The computer program causing computer system 330 to function as various functional units of the RNN training system and speech recognition device 280 in accordance with the above-described embodiments is stored in a DVD 362 or removable memory 364 loaded to DVD drive 350 or memory port 352, and transferred to hard disk 354. Alternatively, the program may be transmitted to computer 340 through network 368 and stored in hard disk 354. The program is loaded to RAM 360 at the time of execution. The program may be directly loaded to RAM 360 from DVD 362, removable memory 364, or through network 368.

The program includes a sequence of instructions consisting of a plurality of instructions causing computer 340 to function as various functional units of the RNN training system and speech recognition device 280 in accordance with the embodiments above. Some of the basic functions necessary to cause computer 340 to operate in this manner may be provided by the operating system running on computer 340, by a third-party program, or dynamically-linkable various programming tool kits or program library installed in computer 340. Therefore, the program itself may not include all functions to realize the system and method of the present embodiment. The program may include only the instructions that dynamically call appropriate functions or appropriate programs in the programming tool kits or in a program library in a controlled manner to attain a desired result and thereby to realize the functions of the system or device described above. Naturally the program itself may provide all necessary functions.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention provides an efficient method of RNN training and, hence, it is usable for building and operating artificial intelligence using a RNN. Specifically, it is applicable to industries manufacturing devices that provide complicated functions with high accuracy such as speech recognition, as well as to industries providing such functions.

REFERENCE SIGNS LIST 40, 104, 108, 112 input layer
42, 70, 102, 106, 110, 114 hidden layer 44, 100 output layer
130 training data sequence
190 training corpus storage unit
192 training data forming unit
194 training data storage unit
196 training unit
198 RNN
280 speech recognition device
304 feature extracting unit
306 feature storage unit
308 acoustic model
310 speech recognition decoder

The invention claimed is:

1. A recurrent neural network (RNN) training method performed by a computer using training data prepared in advance; wherein
the training data includes a sequence of vectors each consisting of a feature of data to be trained and a reference value;
the training method comprising:
initializing the RNN;
designating, as a training start position, a certain vector in the sequence of vectors; and
training the RNN by optimizing various parameters of the RNN such that a prescribed error function calculated for the training data is minimized;
wherein training the RNN by optimizing various parameters of the RNN includes:
updating the parameters of the RNN by Truncated BPTT (Back-propagation through time method), using, of the sequence of vectors, consecutive N vectors, where N is an integer not smaller than 3, having the designated vector as a head, and having a reference value of a vector at the tail of the consecutive N vectors as a correct label, and
repeating, until a predetermined end condition is satisfied, executing the updating of the parameters of the RNN by Truncated BPTT by newly designating a vector at a position satisfying a prescribed relation with the vector at the tail of the N vectors used in the updating of the parameters of the RNN of a preceding repetition;
wherein the vector at the position satisfying the prescribed relation is a vector positioned at least two or more vectors behind the designated vector designated at the designating of the training start position.

2. The RNN training method according to claim 1, wherein the vector at the position satisfying the prescribed relation is a vector positioned at the tail of the N vectors.

3. The RNN training method according to claim 1, further comprising:
responsive to a determination that the end condition is satisfied at the repeating of the updating of the parameters of the RNN until the predetermined end condition is satisfied, of newly designating a vector, positioned by a number smaller than the N behind the vector designated at the designating of the training start position, as a start position of next training; and
executing the training of the RNN by optimizing various parameters of the RNN until the end condition is satisfied.

4. The RNN training method according to claim 1, further comprising:
responsive to a determination that the end condition is satisfied at the repeating of the updating of the parameters of the RNN until the predetermined end condition is satisfied, of executing the training of the RNN by optimizing various parameters of the RNN repeatedly while designating a vector at a position moved further backward by one from the certain vector for each repetition as a start position of next training, until a process designating a vector positioned N−1 behind the certain vector is finished.

5. A non-transitory computer readable medium storing a computer program causing a computer to execute the RNN training according to claim 1.

6. A speech recognition device, comprising a processor configured to:
frame an input speech signal with a prescribed shift length and a prescribed frame length;
extract a prescribed speech feature from each frame of the framed input speech signal and output a feature vector;
implement an acoustic model by a RNN trained by the training method according to claim 1, to receive as an input a sequence of the outputted feature vectors and to output, every time a feature vector is input, a vector having as elements probability of a speech of the frame corresponding to the feature vector being each element of a set of assumed phonemes; and
output, by a probabilistic process using a sequence of vectors output from the acoustic model and a statistical language model, a word sequence having highest likelihood of generating the speech signal.

* * * * *